UNITED STATES PATENT OFFICE.

HENRY BURROWS, OF POULTON-LE-FYLDE, ENGLAND.

PREPARATION OF A METALLIC JOINTING COMPOUND.

1,420,908.   Specification of Letters Patent.   Patented June 27, 1922.

No Drawing.   Application filed March 20, 1922.   Serial No. 545,358.

*To all whom it may concern:*

Be it known that I, HENRY BURROWS, a subject of the King of Great Britain, residing at Poulton-le-Fylde, in the county of Lancaster, England, have invented a certain new and useful Preparation of a Metallic Jointing Compound, of which the following is a specification.

The invention is for a metallic jointing compound, suitable for various kinds of joints, especially when subjected to heat, such as in the cases of steam pipe flange joints, cylinder head joints, pipe connections for gas or oil combustion purposes, boiler seating and motor car radiator joints, and the like.

In carrying out the invention, and in order to produce the compound named, I first prepare two solutions in the manner about to be described. For the first solution, and as an example, I may take 15 parts of gum shellac, 15 parts of pine resin, and 15 parts of gum mastic, which I dissolve in 150 parts by weight of ordinary commercial methylated spirit. After the solution is prepared, I may clarify it by any known means of filtration, to remove sediment.

For the second solution, I may take 15 parts of gum copal, 10 parts of gum amine, 2 parts of Chinese wood oil, 50 parts of Baltic linseed oil, and 50 parts of mineral naphtha. The second solution aforesaid is allowed to stand for a considerable period until all grit, water or other undersirable material is deposited.

Equal parts of the solutions prepared are then mixed together. When the two solutions are completely blended, I introduce into the mixture very finely powdered metallic aluminium, such as is procurable on a commercial scale.

The metallic powder is then thoroughly incorporated until the mixture assumes a perfectly homogeneous consistency, free from any clotted or lumpy portions. The time required for such incorporation will vary according to the temperature of the mixing chamber, but such time will average about 15 minutes.

The compound as thus prepared is of a gelatinous or coloidal consistency, and when applied to a joint adheres closely, and is unaffected in its efficiency by heat subsequently applied. The joint so treated can therefore be readily broken or the flanges or like parts pulled away from each other when desirable. The compound does not crack or otherwise become brittle during use, being thus able to withstand vibration.

The proportions of the various component parts of the mixture may be varied to suit particular conditions.

As an example of porportions suitable for making a compound applicable to metal flange joints, such as are found with motor engines and the like, I may use the two solutions in equal proportions, such as 10 gallons of each, and add thereto $2\frac{3}{4}$ cwts. of the powdered aluminium.

The addition of larger proportions of the metallic powder produces an increasingly stiffer product, capable of being used for heavier work, such as rough steam flanges of large size. With a small porportion of powdered aluminium, say 25 lbs. of the above quantity of solutions, the compound will be thin enough to be used as a paint, and in this form it is very effective when applied to steam boiler settings or similar brickwork.

I claim:—

The preparation of a metallic jointing compound consisting in first dissolving gum shellac, gum mastic, and pine resin in methylated spirit, and separately mixing gum copal, gum amine, Chinese wood oil, and linseed oil with mineral naphtha, combining said solutions, and mixing therewith finely powdered metallic aluminium, substantially as herein set forth.

In testimony whereof I hereunto affix my signature.

HENRY BURROWS.